United States Patent
Mori et al.

(10) Patent No.: US 7,402,198 B2
(45) Date of Patent: Jul. 22, 2008

(54) CARBON DIOXIDE ADSORPTION-DESORPTION MATERIAL AND ADSORPTION-DESORPTION APPARATUS

(75) Inventors: Hisashi Mori, Yokohama (JP); Tomohiro Yamamoto, Yokohama (JP); Yasushige Shigyo, Yokohama (JP); Tadashi Kuwahara, Yokohama (JP)

(73) Assignee: Bridgestone Corporation, Tokyo (JP)

(*) Notice: Subject to any disclaimer, the term of this patent is extended or adjusted under 35 U.S.C. 154(b) by 281 days.

(21) Appl. No.: 11/248,267

(22) Filed: Oct. 13, 2005

(65) Prior Publication Data

US 2006/0037478 A1    Feb. 23, 2006

Related U.S. Application Data

(63) Continuation of application No. PCT/JP2004/004878, filed on Apr. 2, 2004.

(30) Foreign Application Priority Data

Apr. 15, 2003   (JP) .............................. 2003-110507

(51) Int. Cl.
    *B01D 53/02*    (2006.01)
(52) U.S. Cl. .......................................... 96/108; 96/153
(58) Field of Classification Search ................... 96/108, 96/153
    See application file for complete search history.

(56) References Cited

U.S. PATENT DOCUMENTS 6,387,337 B1    5/2002   Pennline et al.

6,712,879 B2 *  3/2004   Kato et al. ..................... 95/139

FOREIGN PATENT DOCUMENTS

| CN | 1242255 A    | 1/2000  |
|----|--------------|---------|
| CN | 1275426      | 12/2000 |
| JP | 8-119765 A   | 5/1996  |
| JP | 09-99214     | 4/1997  |
| JP | 11-90219 A   | 4/1999  |
| JP | 11-128667 A  | 5/1999  |
| JP | 2000-262890 A| 9/2000  |
| JP | 2001-96122   | 4/2001  |
| JP | 2001-170480  | 6/2001  |
| JP | 2001-190950 A| 7/2001  |
| JP | 2001-232186 A| 8/2001  |
| JP | 2001-282685 A| 10/2001 |

OTHER PUBLICATIONS

International Search Report Jul. 2004.

* cited by examiner

*Primary Examiner*—Robert A Hopkins
(74) *Attorney, Agent, or Firm*—Sughrue Mion, PLLC

(57) ABSTRACT

An adsorption-desorption material having a high carbon dioxide adsorption-desorption capability, a low pressure loss, a high thermal diffusion efficiency, and high resistance to repeated stresses, e.g., expansion and shrinkage, as well as an adsorption-desorption apparatus including the adsorption-desorption material, is provided. The adsorbent is composed of a three-dimensional network skeleton structure or a structure having three-dimensional network voids, the structure constructed by a compound having a carbon dioxide adsorption-desorption capability. The carbon dioxide adsorption-desorption apparatus is provided with this adsorbent.

10 Claims, 3 Drawing Sheets

CARBON DIOXIDE ADSORPTION-DESORPTION MATERIAL AND ADSORPTION-DESORPTION APPARATUS

CROSS REFERENCE TO RELATED APPLICATION

This is a continuation application of PCT/JP2004/004878 filed on Apr. 2, 2004.

TECHNICAL FIELD

The present invention relates to an adsorption-desorption material having a high carbon dioxide adsorption-desorption capability, a low pressure loss, a high thermal diffusion efficiency, and high resistance to repeated stresses, e.g., expansion and shrinkage, as well as an adsorption-desorption apparatus including the adsorption-desorption material.

BACKGROUND ART

Currently, as much as about 6 billion tons a year of carbon dioxide is emitted into the air due to the use of fossil fuels in the world. It is said that since carbon dioxide exerts the greenhouse effect, an increase in the atmospheric concentration of carbon dioxide causes an increase in atmospheric temperature on a global scale so as to raise serious environmental issues, e.g., a rise in sea level and abnormal weather. On the other hand, the speed of fixation of carbon dioxide in nature is very slow. Therefore, to take measures against the carbon dioxide is an urgent necessity. Under these circumstances, Japan made a political commitment on a worldwide basis to reduce the overall amount of emission of greenhouse effect gases by at least 6% below the 1990 level in the period 2008 to 2012 based on the international agreement in the 3rd Session of the Conference of the Parties to United Nations Framework Convention on Climate Change (COP3) held in December 1997.

With respect to technologies to make effective use of carbon dioxide, synthesis of methanol serving as a fuel through a catalytic hydrogenation reaction by using a catalyst has been attempted. However, the reaction requires a temperature of 250° C. or more and hydrogen and, therefore, if a fossil fuel is used as an energy source thereof, it becomes useless since fresh carbon dioxide is generated.

It has also been considered as a workaround therefor to generate hydrogen through the electrolysis of water by using electric energy converted from natural energy and to generate methanol through synthesis of the resulting hydrogen and carbon dioxide in the presence of a catalyst. However a large-scale development of natural energy is required and, therefore, the practicability is believed to be low since the cost becomes very high.

As described above, carbon dioxide is in a low energy state and it is difficult to use as energy. However, Japan is a carbon dioxide emission power and emits as much as 1.23 billion tons of carbon dioxide a year. Therefore, to take more down-to-earth measures directed toward the reduction of carbon dioxide is an urgent necessity, and efforts must be made in combination of the development of technology for a high energy conversion efficiency, an energy-conservation policy, and the like.

Under these circumstances, attempts to separate, recover, and fix carbon dioxide without emitting into the atmosphere from thermal power plants, chemical plants, and the like which make up 60 percent of the overall amount of emission of carbon dioxide, and to reserve in the ground or under the sea have been conducted all over the world. Consequently, emergence of a high-temperature reversible reaction type material capable of repeatedly adsorbing and desorbing carbon dioxide, exhibiting a low pressure loss, and having a high adsorption-desorption efficiency is desired in order to reduce the separation and recovery costs as well.

Examples of up-and-coming clean energy include a fuel cell system by using hydrogen. Attempts to use a natural gas which is an abundant resource and in a high energy state or methane which is a primary component of a methane hydrate as a means for producing hydrogen serving as a fuel have been intensively conducted at present. Since the generation of hydrogen from methane is based on a steam reforming reaction of methane, carbon dioxide is generated as a by-product.

As described above, in a social form in which the fuel cell has become the mainstream as well, it is believed that the establishment of technologies for separation, recovery, and fixation of carbon dioxide is an inevitable issue to prevent global warming.

In order to efficiently recover carbon dioxide, it is desirable to separate a gas having as high a concentration as possible, and a method of separation before combustion has been studied, in which carbon dioxide is separated at a stage of a reformed fuel gas before combustion. Since the steam reforming reaction of methane is generally conducted within the range of 400° C. to 600° C., it is desirable to separate and recover carbon dioxide from a high-temperature gas in order to achieve separation of carbon dioxide before combustion from the viewpoint of the effective use of thermal energy as well.

Examples of previously known technologies to absorb carbon dioxide include a chemical absorption method by using β-aminoethyl alcohol or an alkaline aqueous solution, e.g., potassium carbonate, sodium carbonate, potassium hydroxide, sodium hydroxide, or lithium hydroxide; a membrane separation method by using a cellulose acetate membrane; and a physical adsorption method by using a physical adsorbent, e.g., zeolite or molecular sieve. However, these known technologies cannot efficiently separate and recover carbon dioxide from a high-temperature gas exceeding 400° C. because of limitation of heat resistance.

With respect to the technology for separating and recovering carbon dioxide from a high-temperature gas, Japanese Unexamined Patent Application Publication No. 9-99214 has introduced a technology through the use of lithiated zirconium, as a method for separating carbon dioxide by using a temperature difference as a driving source without pressure control. Japanese Unexamined Patent Application Publication No. 2001-96122 has introduced that lithium silicate having an average particle diameter of 0.1 to 10 μm is used as a material for absorbing carbon dioxide at a temperature within the range of 100° C. to 700° C. Japanese Unexamined Patent Application Publication No. 2001-232186 has introduced a method in which lithium zirconate is dispersed in lithium silicate is introduced as a method for directly separating and recovering carbon dioxide in a high-temperature exhaust gas from an apparatus to burn hydrocarbon. Furthermore, Japanese Unexamined Patent Application Publication No. 2001-170480 has introduced a technology for improving carbon dioxide absorption capability over a wider concentration range by adding an alkali carbonate to lithium silicate.

In the case where a carbon dioxide adsorption-desorption material is filled in an adsorption-desorption tower or the like and is used for adsorbing and desorbing carbon dioxide, examples of material characteristics required of the material for the structure include high carbon dioxide adsorption-desorption capability, a low pressure loss, a high thermal diffusion efficiency, and high resistance to repeated stresses, e.g., expansion and shrinkage.

However, each of the forms of carbon dioxide adsorption-desorption materials introduced by these documents is in the shape of a powder or is molded into the shape of pellets by a method of pressure molding in a mold. Consequently, in the case where these carbon dioxide adsorption-desorption materials are used actually by being filled in apparatuses, the capabilities of these carbon dioxide adsorption-desorption materials cannot be fully used since problems may occur resulting from the pressure loss, satisfactory amounts of materials may not be filled in, or heat may not be uniformly transferred throughout the carbon dioxide adsorption-desorption materials filled in.

In addition, emergence of a high-temperature reversible reaction material capable of repeatedly adsorbing and desorbing carbon dioxide is desired in order to reduce the separation and recovery cost as well. However, the material is subjected to repeated stresses of expansion and shrinkage by adsorption-desorption operations. On the other hand, with respect to the material processed by a method of pressure molding in a mold, there are very small spaces to relax the stresses. Consequently, a problem occurs in that the molded pellets cannot withstand the repeated stresses and are gradually powdered.

DISCLOSURE OF INVENTION

It is an object of the present invention to overcome the above-described known problems and provide an adsorption-desorption material having a high carbon dioxide adsorption-desorption capability, a low pressure loss, a high thermal diffusion efficiency, and high resistance to repeated stresses, e.g., expansion and shrinkage, as well as an adsorption-desorption apparatus including the adsorption-desorption material.

A carbon dioxide adsorption-desorption material according to an aspect of the present invention is characterized by being composed of a three-dimensional network skeleton structure or a structure having three-dimensional network voids, the structure constructed by a compound having a carbon dioxide adsorption-desorption capability.

A carbon dioxide adsorption-desorption apparatus according to another aspect of the present invention is characterized by including the above-described carbon dioxide adsorption-desorption material according to the present invention.

That is, in order to overcome the above-described problems in the known technologies, the inventor of the present invention intensively conducted studies on molding a compound having carbon dioxide adsorption-desorption capability (hereafter may be referred to as "an adsorption-desorption component") into a three-dimensional network skeleton structure or a structure having three-dimensional network voids (hereafter referred to as "three-dimensional network void structure") as a method for increasing the density and the geometrical surface area of the carbon dioxide adsorption-desorption material. As a result, it was found that carbon dioxide adsorption-desorption capability larger than the capability of an adsorption-desorption component processed into a powder can be attained by molding the component into the above-described structure.

The material characteristics required to increase the capability of treating carbon dioxide include an improved contact efficiency with a carbon dioxide gas. The adsorbent has a specific adsorption rate depending on the type and the concentration of the gas and the temperature and the pressure in the system. However, with respect to the relationship between the adsorption rate and the space velocity, if the space velocity is higher, the time required for adsorption becomes unsatisfactory and, thereby, the adsorption efficiency is significantly decreased. Therefore, the control of the space velocity and the linear velocity is very important in the design of adsorption. In general, the space velocity is represented by $SV=Q/V=(m^3/hr)/m^3=hr^{-1}$, and is discussed separately from the linear velocity (m/sec).

The amount of flow must be maximized to increase the carbon dioxide treatment capability. However, since the material has an adsorption rate specific to the environment condition, when a space velocity is decreased simply, an adsorption-inert zone is simply shifted in a rearward direction of the stream, and an improvement of the treatment efficiency cannot be expected. Therefore, it is necessary to increase the carbon dioxide treatment capability while the linear velocity is decreased. Simultaneously, this results in a generality that the apparatus becomes larger by increasing the treatment capability.

The structure design of the adsorbent holds the key how to achieve the objective of compacting an apparatus under the above-described physical limiting conditions. The material characteristics required therefor are to mold into a structure having excellent gas diffusibility in such a way that gases can diffuse throughout all parts of the material from both a macroscopic viewpoint and a microscopic viewpoint and to improve the geometrical surface area and the adsorption specific surface area (BET surface area).

The inventor of the present invention overcame the problems in the known technologies by developing a technology related to a carbon dioxide adsorption-desorption structure which served as the key among these technologies for separating and recovering carbon dioxide, and made it possible to provide a material having a high capability to treat carbon dioxide, a low pressure loss, a high thermal diffusion efficiency, and high resistance to repeated stresses, e.g., expansion and shrinkage.

BEST MODE FOR CARRYING OUT THE INVENTION

Figure 1:
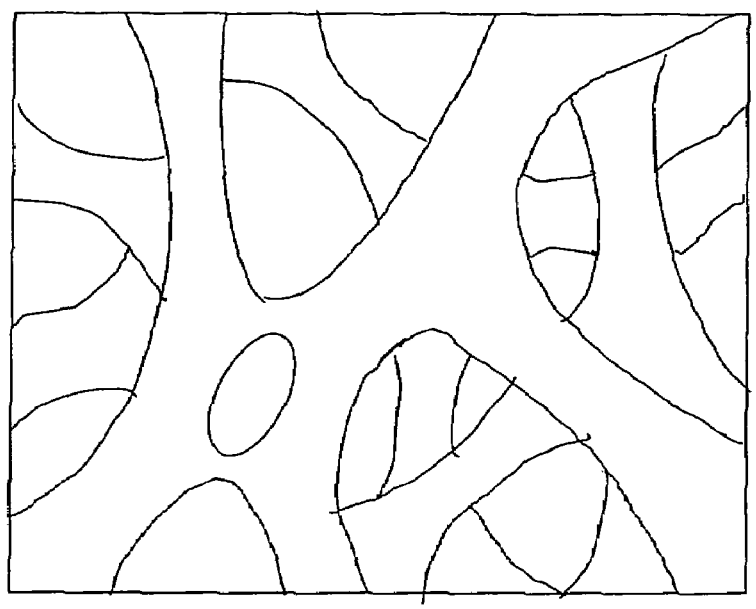
FIG. 1 is a schematic diagram showing a rough structure of a lithium silicate structure having a three-dimensional network skeleton structure, produced in Examples 1 and 2.

The embodiments of a carbon dioxide adsorption-desorption material and an adsorption-desorption apparatus according to the present invention will be described below in detail.

Examples of adsorption-desorption components constituting the adsorption-desorption material of the present invention include at least one selected from the group consisting of oxides, hydroxides, and salts of alkali metals and alkaline-earth metals. Among them, preferable materials have reversible characteristics in order that adsorption can be conducted within a relatively wide temperature range and, in addition, adsorbed carbon dioxide can be readily desorbed and be adsorbed again by controlling the temperature and the pressure. Specific examples thereof include $Li_4SiO_4$, $Li_2SiO_3$, $Li_6Si_2O_7$, $Li_8SiO_6$, $Li_2ZrO_3$, $Li_4ZrO_4$, $Li_2NiO_2$, $2LiFeO_2$, $Li_2O$, $Na_2O$, $CaO$, $LiAlO_2$, $LiOH$, $KOH$, $NaOH$, $Ca(OH)_2$, $Ba(OH)_2$, $Sr(OH)_2$, $K_2CO_3$, $Na_2CO_3$, $Li_2CO_3$, $BaCO_3$, $CaCO_3$, and $SrCO_3$. Most of all, $Li_4SiO_4$, $Li_2ZrO_3$, $Li_2O$, and $LiAlO_2$ are preferable from a standpoint that the adsorption and desorption can be conducted within a relatively wide temperature range.

The above-described adsorption-desorption component can be produced by subjecting a mixture of at least one inorganic compound selected from the group consisting of oxides, hydroxides, and salts of alkali metals and alkaline-earth metals and an inorganic oxide other than alkali metal oxides and alkaline-earth metal oxides to firing and/or synthesis at 600° C. or more. Here, examples of inorganic compounds used for producing the adsorption-desorption component include at least one of $Li_2CO_3$, $Li_2O$, $LiOH$, $K_2CO_3$, $KOH$, $Na_2CO_3$, $NaOH$, $Ca(OH)_2$, $Ba(OH)_2$, $Sr(OH)_2$, $CaCO_3$, $BaCO_3$, $SrCO_3$, and the like. Examples of inorganic oxides include at least one of $SiO_2$, $Al_2O_3$, $ZrO_2$, $MgO$, $Fe_2O_3$, $NiO$, $TiO_2$, and the like.

The adsorption-desorption component of the present invention having a three-dimensional network skeleton structure or a three-dimensional network void structure can be produced by impregnating an organic base material having a three-dimensional network skeleton structure with the above-described adsorption-desorption component or a slurry containing raw materials capable of synthesizing the adsorption-desorption component through firing (hereafter may be referred to as "raw material slurry"), followed by drying and firing.

In this case, an adsorption-desorption material which is a three-dimensional network skeleton structure in the shape following the shape of the organic base material can be produced by adhering the above-described raw material slurry to a skeleton surface of the organic base material having a three-dimensional network skeleton structure so as to cover the skeleton surface of the organic base material with the raw material slurry, and conducting drying and firing. Alternatively, an adsorption-desorption material which is a three-dimensional network void structure having three-dimensional network voids in the portion, from which the organic base material has been eliminated, can be produced by impregnating the void portions of the organic base material having a three-dimensional network skeleton structure with the raw material slurry so as to fill in the void portions, and conducting drying and firing.

Here, the material and the shape of the organic base material having a three-dimensional network skeleton structure are not specifically limited as long as the organic base material is a thermosetting resin since shrinkage and deformation associated with the firing must be controlled. However, the shape exhibiting a low pressure loss and good gas diffusibility is preferable from the viewpoint of the separation and recovery efficiency of carbon dioxide. Specifically, a polyester based urethane foam, a polyether based urethane foam, or a polyethylene foam having a three-dimensional network skeleton structure; felt; a three-dimensional structure resin net formed from short fibers or a plurality of fibers and made of polyester or polyamide resin; a nonwoven fabric, e.g., polyester nonwoven fabric; paper; corrugated paper; and the like can be used.

In general, the adsorption-desorption component constituting the adsorption-desorption material is very strongly basic. Therefore, from the viewpoint of a working environment and handleability as well, it is preferable to synthesize the adsorption-desorption component simultaneously with molding into the above-described three-dimensional structure. However, with respect to a method in which the adsorption-desorption component is synthesized simultaneously with being molded, volumetric shrinkage may occur remarkably at the same time, as in the case where lithium silicate is synthesized from 2 mol of lithium carbonate and 1 mol of silicon dioxide and reduction in weight occurs associated with the synthesis. Therefore, decrease in the structure strength against the firing shrinkage stress must be reduced.

Examples of means for improving the structure strength of the adsorption-desorption material of the present invention include that particles of constituent raw materials in the raw material slurry are made as fine as possible; that firing is conducted at an optimum temperature; that bonding between particles of constituent raw materials in a state before firing is made as minute and dense as possible; and that other inorganic additives are mixed in the case where maintenance of the strength as the structure is difficult by the fired adsorption-desorption component alone.

The particle diameters before firing of constituent raw materials to be used for producing the structure of the adsorption-desorption material of the present invention are not specifically limited since the strength required of the structure is different depending on uses. However, preferably, the average particle diameter is 10 μm or less, and more preferably is 5 μm or less, for example, 5 to 5,000 nm. If the average particle diameter exceeds 10 μm, generally in many cases, an adequate strength cannot be attained although depending on a molten state during firing.

The optimum firing temperature for producing the structure of the adsorption-desorption material of the present invention is not specifically limited as long as the firing temperature is more than or equal to the temperature suitable for synthesis or melting temperature of the adsorption-desorption component constituting the adsorption-desorption material or the burn-off temperature or the sublimation temperature of the above-described organic base material to play a role in forming the network void portions and the skeleton, and furthermore, the firing temperature is less than or equal to the melting temperature of the selected adsorption-desorption component. However, preferably, the firing temperature is 600° C. to 1,700° C., and more preferably is 800° C. to 1,200° C. If the firing temperature is less than 600° C., the organic base material cannot be completely ashed and, thereby, gases originated from the organic base material may be generated during the adsorption-desorption operation of carbon dioxide. In addition, if the firing temperature is less than 600° C., firing may become inadequate so that, in some cases, a problem occurs in the strength of the structure. On the other hand, if the firing temperature exceeds 1,700° C., in some cases, problems occur in the shape stability of the structure associated with melting. In particular, for example, when an alkali metal salt is added in order to lower the carbon dioxide adsorption-desorption temperature range, the structure may not be formed since the melting temperature is also lowered at the same time. That is, for example, in a formula of Example 1 described below, 2 mol of lithium carbonate, 1 mol of silicon dioxide, and 0.1 mol of potassium carbonate are mixed, a slurry in which 65 percent by weight of solids are dispersed in water is prepared as a base, and a polyurethane foam having a three-dimensional network skeleton structure is impregnated therewith by immersion, followed by drying and firing. However, it is known that if the firing temperature is raised to 1,300° C. in a nitrogen purge state, a liquid phase results completely, and no structure is constructed.

A method in which bonding between particles of constituent raw materials in a state before firing is made as minute and dense as possible, and an organic additive is mixed into the raw material slurry to maintain the bonding can also be adopted. In this case, it is better to select organic additives which are dissolved in water or exhibit good water dispersibility and have high caking powers. The types of these organic additives are not specified since the compatibility with an adsorption-desorption component selected as a material for constituting the adsorption-desorption material must be taken into consideration. However, it is preferable that the additive can maintain the structure strength against the shrinkage during synthesis even at a small usage of additive in order to increase the density of the adsorption-desorption component after firing.

Examples of organic additives recommended from this point of view include urethane based emulsions, SBR based latexes, NBR based latexes, natural rubber latexes, chloroprene latexes, acrylic emulsions, acrylonitrile-butadiene based latexes, PVC based latexes, sodium polyacrylates, ammonium polyacrylates, carboxymethyl cellulose, casein, acrylic ester copolymers, polycarboxylic acids, polyolefin based resins, naphthalenesulfonic acid condensates, methacrylic acid based polymers, amylose, amylopectin, glucan, methyl cellulose, hydroxypropyl methyl cellulose, carboxymethyl cellulose, polyvinyl alcohol, polyethylene oxide, polyacrylamide, polyvinyl butyral, ethyl cellulose, cellulose acetate, ethylene vinyl acetate copolymers, polyethylene glycols, glycerin, and dibutyl phthalate. At least one of these organic additives may be used alone or in combination.

The levels of addition of these organic additives are not specifically limited since the bonding property to a selected adsorption-desorption component and slurry behavior during mixing must be taken into consideration. However, it is preferable to prepare a raw material slurry containing 1 to 100 parts by weight, in particular 5 to 50 parts by weight, of adsorption-desorption component or raw materials for the adsorption-desorption component relative to 1 part by weight of solids of organic additive.

The solid concentration of the raw material slurry should be appropriately adjusted in accordance with the purpose and, therefore, is not specifically limited. However, about 50 to 85 percent by weight is preferable, and about 60 to 75 percent by weight is more preferable. If the solid concentration of the raw material slurry is less than 50 percent by weight, the weight of adhesion after drying to the organic base material used for forming the structure cannot be increased and, therefore, the strength of the resulting structure may be significantly reduced and the carbon dioxide adsorption-desorption capability per unit volume may be reduced. If the solid concentration of the raw material slurry exceeds 85 percent by weight, the drying speed is excessively increased. Consequently, cracks may occur so as to cause reduction in the structure strength, and characteristics of the raw material slurry may be significantly deteriorated so as to exhibit significant thixotropy and interfere the impregnation operation.

An ideal carbon dioxide adsorption-desorption material is a structure constructed by an adsorption-desorption component alone. However, in the case where the strength of the structure does not reach a desired level even after being subjected to the above-described method, the structure having the desired level of strength can be produced by adding an inorganic additive to the raw material slurry. In this case, examples of inorganic additives used as reinforcing materials include inorganic oxides, e.g., $Al_2O_3$, $SiO_2$, MgO, and $ZrO_2$; inorganic argillaceous materials, e.g., kaolinite, bentonite, sericite, montmorillonite, activated clay, and talc; and low thermal expansion materials, e.g., cordierite ($2MgO$, $2Al_2O_3$, $5SiO_2$). At least one of these inorganic additives may be used alone or in combination.

Alkali metal oxides, e.g., $Na_2O$ and $K_2O$, alkaline-earth metals, e.g., CaO, and metal oxides, e.g., $Fe_2O_3$, NiO, and $TiO_2$, can also provide the structure strength. However, they become factors of an increase in thermal expansion coefficient of the structure and a reduction in melting point. Therefore, they must be appropriately selected in consideration of the carbon dioxide adsorption-desorption capability, the initial strength, the strength against repeated adsorption and desorption, and the like.

In Examples described below, potassium carbonate ($K_2CO_3$) is added to accelerate conversion to a liquid phase during firing in order that the strength of the resulting structure is increased. Examples of materials used for accelerating the above-described conversion to a liquid phase can include $Na_2CO_3$, $Ba_2CO_3$, $SrCO_3$, and $CaCO_3$, in addition to $K_2CO_3$. Preferably, the usage thereof is specified to be about 1 to 50 percent by mole relative to the adsorption-desorption component to be synthesized.

The porosity of the three-dimensional network skeleton structure or the three-dimensional network void structure of the adsorption-desorption material of the present invention is different depending on the allowable pressure loss and packing capacity of an adsorption-desorption apparatus to be used and, therefore, the porosity should be appropriately selected. However, a preferable porosity is 25% to 95%, and more preferably is 50% to 90%. If the porosity becomes less than 25%, the packing density of the adsorption-desorption material is increased. However, gases cannot diffuse into the inside of the adsorption-desorption material, the adsorption-desorption capability may be reduced, the pressure loss may be significantly increased and, thereby, problems may occur in practical use. If the porosity exceeds 95%, the content of adsorption-desorption components per unit volume is reduced. Consequently, problems occur in that, for example, a packing capacity of the adsorption-desorption material must be increased and, thereby, the adsorption-desorption apparatus may become larger.

The porosity can readily be controlled by controlling the volumetric capacity of holes and the number of cells of the organic base material having a three-dimensional network skeleton structure responsible for the skeleton base material and voids and by a method for producing the structure.

The porosity is appropriately determined in accordance with the purpose of use, required capabilities, and the like. For example, adsorption-desorption materials produced in Examples 1 and 2 described below have low apparent densities but relatively large porosities and, therefore, have a feature that the pressure loss can be reduced. Examples 3 and 4 can attain relatively small porosities and, therefore, have a feature that the apparent densities can be increased.

The adsorption-desorption apparatus of the present invention is provided with the above-described adsorption-desorption material of the present invention. For example, a column including an inlet of a gas containing carbon dioxide and an outlet of a treated gas can adopt a configuration in which a unit filled in with the adsorption-desorption material of the present invention is disposed in a direction intersecting a direction of the stream or a system in which the three-dimensional network void structure is molded into a cylindrical shape and the stream is directed from the inside or the outside of the cylinder toward a wall surface on the opposite side.

EXAMPLES AND COMPARATIVE EXAMPLES

The present invention will be more specifically described below with reference to Examples and Comparative examples.

Example 1

A polyurethane foam (trade name "EVERLIGHT SF, HR-08") produced by Bridgestone Corporation was used as an organic base material having a three-dimensional network skeleton structure. This was impregnated by immersion with a slurry containing inorganic raw materials which exhibited carbon dioxide adsorption-desorption capability after being fired at 900° C., and an excess slurry was removed, followed by drying and firing, so that a carbon dioxide adsorption-desorption material having a three-dimensional network skeleton structure was produced.

Lithium silicate capable of adsorbing and desorbing carbon dioxide within a relatively wide temperature range was noted as the carbon dioxide adsorption-desorption material to be used in this Example 1, and research was conducted in order that the synthesis proceeded simultaneously with the firing of the three-dimensional structure in consideration of the working environment.

Consideration was given in order that the strength during firing was increased and at the same time, carbon dioxide was able to be adsorbed and desorbed within a wider temperature range (400° C. to 800° C.) by selecting $Li_2CO_3$ (average particle diameter 3 μm) and $SiO_2$ (average particle diameter 3 μm) as the starting raw materials to produce lithium silicate and by adding $K_2CO_3$ (average particle diameter 3 μm) as an alkali carbonate to accelerate conversion to a liquid phase.

Initially, 2 mol of $Li_2CO_3$, 1 mol of $SiO_2$, and 0.1 mol of $K_2CO_3$ were mixed adequately in a mortar, and ion-exchanged water was put into the resulting mixed powder, followed by mixing, so that a slurry having a solid content of 65 percent by weight was prepared.

The above-described polyurethane foam having a three-dimensional network skeleton structure and cut into 50 mm×50 mm×25 mm thick was impregnated with the resulting slurry by immersion, and an excess slurry was squeezed out with impregnation rolls and was removed. The weight of adhesion of the slurry at this time was 250 g/L-dry foam. A method for adjusting the amount of impregnation can be appropriately selected from a method by using an air spray, a method by using centrifugal separation, and the like besides the method by using rolls in accordance with the purpose.

The impregnated material produced by the above-described method was dried in a constant temperature bath at 60° C. for 3 hours and, thereafter, was transferred into an electric furnace capable of being nitrogen-purged. The temperature was raised up to 900° C. at a speed of 2° C./min while nitrogen purge was conducted at 1 L/min. After the temperature was raised, the furnace was stood to cool until the temperature in the furnace reached ambient temperature, so that a lithium silicate structure having a three-dimensional network skeleton structure was produced.

Example 2

An inorganic raw materials which exhibited carbon dioxide adsorption-desorption capability after being fired at 900° C. was mixed with an organic additive so as to prepare a slurry. A polyurethane foam, which was similar to that used in Example 1, having a three-dimensional network skeleton structure was impregnated with the resulting slurry by immersion, and an excess slurry was removed, followed by drying and firing, so that carbon dioxide adsorption-desorption material having a three-dimensional network skeleton structure was produced.

As in Example 1, lithium silicate capable of absorbing carbon dioxide within a relatively wide temperature range was noted as the carbon dioxide adsorption-desorption material to be used in Example 2, and $Li_2CO_3$ and $SiO_2$ were selected as the starting raw materials to produce lithium silicate. As in Example 1, consideration was given in order that the strength during firing was increased and at the same time, carbon dioxide was able to be adsorbed and desorbed within a wider temperature range (400° C. to 800° C.) by adding $K_2CO_3$ as an alkali carbonate to accelerate conversion to a liquid phase.

Initially, 2 mol of $Li_2CO_3$, 1 mol of $SiO_2$, and 0.1 mol of $K_2CO_3$ were mixed adequately in a mortar, and ion-exchanged water was put into the resulting mixed powder, followed by mixing, so that a slurry having a solid content of 71.3 percent by weight was prepared.

Subsequently, 31.7 percent by weight of acrylonitrile-butadiene based latex having an average particle diameter of 0.12 μm, Tg of 10° C., and a solid content of 45 percent by weight was added as an organic additive to the resulting slurry, followed by agitating adequately, so that a slurry having a solid content of 65 percent by weight was prepared.

The above-described polyurethane foam having a three-dimensional network skeleton structure and cut into 50 mm×50 mm×25 mm thick was impregnated with the resulting slurry by immersion, and an excess slurry was squeezed out with impregnation rolls and was removed. The amount of adhesion of the slurry at this time was 303 g/L-dry foam.

The impregnated material produced by the above-described method was dried in a constant temperature bath at 60° C. for 3 hours and, thereafter, was transferred into an electric furnace capable of being nitrogen-purged. The temperature was raised up to 900° C. at a speed of 2° C./min while nitrogen purge was conducted at 1 L/min. After the temperature was raised, the furnace was stood to cool until the temperature in the furnace reached ambient temperature, so that a lithium silicate structure having a three-dimensional network skeleton structure was produced.

FIG. 1 is a schematic diagram showing a rough structure of the lithium silicate structure having a three-dimensional network skeleton structure, produced in the above-described Examples 1 and 2.

Example 3

The polyurethane foam used in Example 1, having a three-dimensional network skeleton structure was impregnated by immersion with the slurry used in Example 1, containing inorganic raw materials which exhibited carbon dioxide adsorption-desorption capability after being fired at 900° C. in such a way that void portions of the three-dimensional network skeleton structure of the polyurethane foam were completely filled in with the slurry and, thereafter, drying was conducted in an oven at 80° C. for 60 minutes, as a means for producing a carbon dioxide adsorption-desorption material having three-dimensional network voids.

The slurry used in the above-described Example 1 was poured into a PTFE mold (inside dimension 50 mm×50 mm×25 mm thick) having a wall thickness of 5 mm and having the size in which the sample after impregnation and drying was tightly stored. Furthermore, the above-described sample after impregnation and drying was set thereon, and the above-described slurry was also poured over the sample.

Subsequently, the above-described mold was set in a vacuum dryer capable of producing a vacuum state of about 133 Pa (1 Torr), and deaeration and drying were conducted at 80° C. for 1 hour, followed by releasing from the mold, so as to produce an unfired sample to which 715 g/L-dry foam of slurry was adhered.

The resulting sample was transferred into an electric furnace capable of being nitrogen-purged. The temperature was raised up to 900° C. at a speed of 2° C./min while nitrogen purge was conducted at 1 L/min. After the temperature was raised, the furnace was stood to cool until the temperature in the furnace reached ambient temperature, so that a lithium silicate structure having a three-dimensional network void structure was produced.

Example 4

Example 4 was a system in which an organic adhesive was contained in a slurry. A carbon dioxide adsorption-desorption material having three-dimensional network voids was produced in a manner similar to that in Example 3.

The method for preparing a slurry containing an organic adhesive was in conformity with that in Example 2, and the resulting slurry was used. In a manner similar to that in Example 3, a polyurethane foam having a three-dimensional network skeleton structure was impregnated by immersion with the slurry in such a way that void portions thereof were completely filled in with the slurry and, thereafter, drying was conducted in an oven at 80° C. for 60 minutes.

The slurry used in the above-described Example 2 was poured into a PTFE mold (inside dimension 50 mm×50 mm×25 mm thick) having a wall thickness of 5 mm and having the size in which the sample after impregnation and drying was tightly stored. Furthermore, the above-described sample after impregnation and drying was set thereon, and the above-described slurry was also poured over the sample.

Subsequently, the above-described mold was set in a vacuum dryer capable of producing a vacuum state of about 133 Pa (1 Torr), and deaeration and drying were conducted at 80° C. for 1 hour, followed by releasing from the mold, so as to produce an unfired sample to which 855 g/L-dry foam of slurry was adhered.

The resulting sample was transferred into an electric furnace capable of being nitrogen-purged. The temperature was raised up to 900° C. at a speed of 2° C./min while nitrogen purge was conducted at 1 L/min. After the temperature was raised, the furnace was stood to cool until the temperature in the furnace reached ambient temperature, so that a lithium silicate structure having a three-dimensional network void structure was produced.

Figure 2:
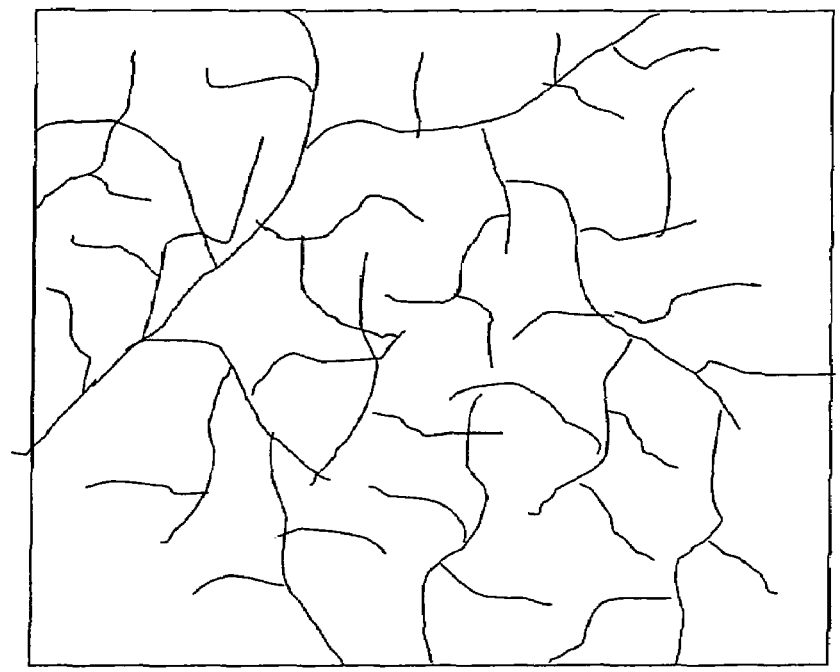
FIG. 2 is a schematic diagram showing a rough structure of a lithium silicate structure having a three-dimensional network void structure, produced in Examples 3 and 4.

FIG. 2 is a schematic diagram showing a rough structure of the lithium silicate structure having a three-dimensional network void structure, produced in the above-described Examples 3 and 4. In this structure, a myriad of voids remain after the organic base material, the polyurethane foam, was burnt off by firing.

Comparative Example 1

For purposes of comparison of the carbon dioxide adsorption-desorption capabilities of the carbon dioxide adsorption-desorption materials according to Examples, a powder was synthesized by using the inorganic raw materials which were used in Example 1 and which exhibited carbon dioxide adsorption-desorption capability after being fired at 900° C. As in Example 1, $Li_2CO_3$ and $SiO_2$ were selected as the starting raw materials to produce lithium silicate, and $K_2CO_3$ was also added as in Examples.

Initially, 2 mol of $Li_2CO_3$, 1 mol of $SiO_2$, and 0.1 mol of $K_2CO_3$ were dry-mixed adequately in a mortar, and ion-exchanged water was put into the resulting mixed powder in such a way that the solid concentration becomes 65 percent by weight, followed by wet-mixing for 10 minutes. The resulting slurry was transferred to a SUS palette, was dried in a constant temperature bath at 60° C. for 3 hours and, thereafter, was pulverized in a mortar.

The thus produced powder was transferred into an electric furnace capable of being nitrogen-purged. The temperature was raised up to 900° C. at a speed of 2° C./min while nitrogen purge was conducted at 1 L/min. After the temperature was raised, the furnace was stood to cool until the temperature in the furnace reached ambient temperature. The resulting powder was pulverized again in a mortar, so that a powder having an average particle diameter of 3 μm was produced.

Comparative Example 2

In order to grasp the influence of mixing of the organic additive exerted on the capability of the carbon dioxide adsorption-desorption material, 2 mol of $Li_2CO_3$, 1 mol of $SiO_2$, and 0.1 mol of $K_2CO_3$ were dry-mixed adequately in a mortar, and ion-exchanged water was put into the resulting mixed powder in such a way that the solid concentration becomes 71.3 percent by weight, followed by wet-mixing for 10 minutes.

Subsequently, 31.7 percent by weight of acrylonitrile-butadiene based latex, which was used in Examples 2 and 4, having an average particle diameter of 0.12 μm, Tg of 10° C., and a solid content of 45 percent by weight was added as an organic additive to the resulting slurry, followed by agitating adequately, so that a slurry having a solid content of 65 percent by weight was prepared. The resulting slurry was transferred to a SUS palette, was dried in a constant temperature bath at 60° C. for 3 hours and, thereafter, was pulverized in a mortar.

The thus produced powder was transferred into an electric furnace capable of being nitrogen-purged. The temperature was raised up to 900° C. at a speed of 2° C./min while nitrogen purge was conducted at 1 L/min. After the temperature was raised, the furnace was stood to cool until the temperature in the furnace reached ambient temperature. The resulting powder was pulverized again in a mortar, so that a powder having an average particle diameter of 3 μm was produced.

With respect to the samples produced in Examples 1 to 4 and Comparative examples 1 and 2 as described above, the carbon dioxide adsorption-desorption capabilities, pressure losses, and various properties were measured by the following methods.

<Measurement of Carbon Dioxide Adsorption-desorption Capability>

Each of the samples produced in Examples 1 to 4 was weighed beforehand with an analytical balance. Thereafter, each sample was independently put in a crucible having an inner diameter of 100 mm. An electric furnace capable of undergoing vacuum gas purge was used, and the adsorption-desorption capability was examined by measuring the rate of change in weight associated with adsorption and desorption of carbon dioxide with an analytical balance.

The weights at this time resulted in 9.42 g in Example 1, 9.52 g in Example 2, 26.93 g in Example 3, and 26.85 g in Example 4.

With respect to the powder samples of Comparative examples 1 and 2, the same crucible having a diameter of 100 mm was used, and the weight was adjusted at 9.42 g by using the analytical balance in order that the weight becomes equal to the weight of lithium silicate contained in the structures of Examples 1 and 2.

In order to prevent variations in measurement based on a setting position in the electric furnace, consideration was given in order that all the samples were set at the same position. Therefore, each of the samples produced in Examples 1 to 4 and Comparative examples 1 and 2 was subjected to the measurement independently of other samples.

With respect to the operation condition of the vacuum gas purge, the temperature was raised from ambient temperature to 50° C. at a rate of 10° C./min, and after the temperature reached 50° C., evacuation was started. When $10^{-4}$ Pa of vacuum was reached, the vacuum was kept for 5 minutes. Thereafter, 100 percent concentration of carbon dioxide gas was fed into the electric furnace at a rate of 1 L/min. When the inside of the chamber reached atmospheric pressure, the introduced gas was released to the air, so that the inside of the chamber was prevented from becoming in a pressurized state. With respect to the temperature control, the temperature was raised up to 650° C. at a rate of 10° C./min, and when the temperature reached 650° C., the temperature was kept for 4 hours, so that carbon dioxide was brought into a saturated adsorption state. Subsequently, the temperature was lowered by standing to cool, and when ambient temperature was reached, the weight of the sample was measured, so as to calculate the carbon dioxide adsorption ratio. The carbon dioxide gas was allowed to continue flowing at a rate of 1 L/min until the inside of the furnace reached 50° C.

In order to grasp the carbon dioxide adsorption capabilities of samples of Examples 1 to 4 and Comparative examples 1 and 2, carbon dioxide absorbed once by all samples having been subjected to the carbon dioxide adsorption test was desorbed at 850° C. through the vacuum gas purge as in the above description.

The temperature was raised from ambient temperature to 50° C. at a rate of 10° C./min, and after the temperature reached 50° C., evacuation was started. When $10^{-4}$ Pa of vacuum was reached, the vacuum was kept for 5 minutes. The temperature was further raised up to 850° C. at a rate of 10° C./min while the vacuum was maintained, and after the temperature reached 850° C., the temperature was kept for 4 hours, so as to desorb the carbon dioxide having been adsorbed. Subsequently, the temperature was lowered by standing to cool, and when ambient temperature was reached, the weight of the sample was measured, so as to determine a decrease in weight associated with the desorption of carbon dioxide.

These test conditions can also be used for design of an adsorption-desorption apparatus, and the adsorption-desorption operation time can be reduced in accordance with the purpose.

The results are shown in Table 1.

<Measurement of Pressure Loss>

Figure 3:
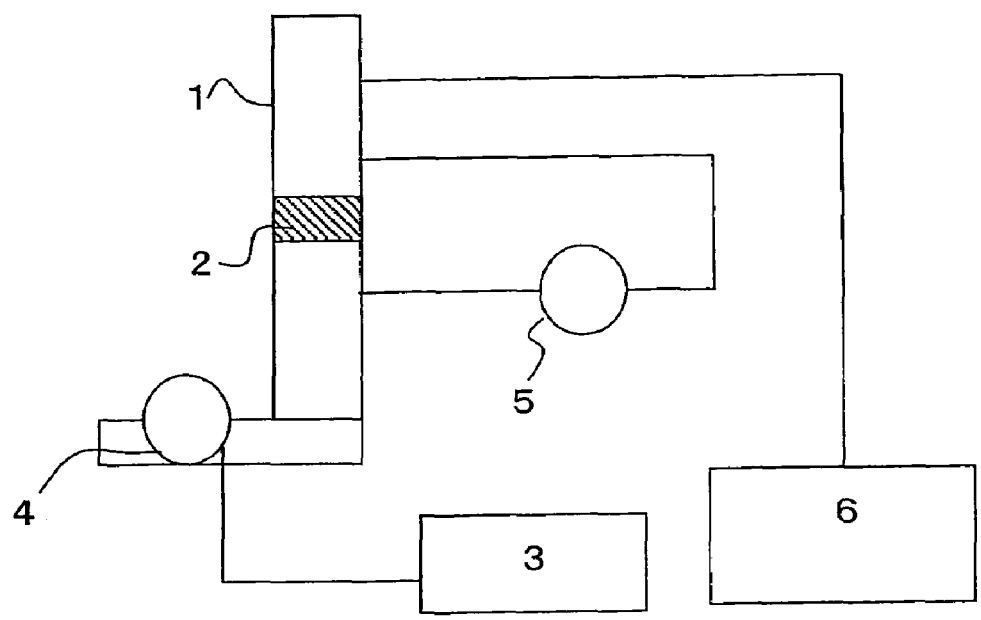
FIG. 3 is a configuration diagram of a test apparatus used for measuring pressure losses of samples of Examples 1 to 4.

The samples of Examples 1 to 4 were subjected to measurements with an apparatus including a vertical wind tunnel 1 having an inside dimension of 50 mm×50 mm, as shown in FIG. 3. With respect to this test apparatus, a sample 2 is set in a wind tunnel 1, the wind speed is varied by controlling the number of revolutions of an air blower 4 with an inverter 3, a pressure difference between the upstream and the downstream to the sample 2 at a predetermined wind speed is measured with a manometer 5, so as to determine a pressure loss. Reference numeral 6 denotes an anemometer. By using this test apparatus, the pressure difference (pressure loss) between the upstream and the downstream to the sample 2 when air was blown at a wind speed of 1 m/sec, 2 m/sec, or 3 m/sec was measured with the manometer 5. A gap between the inner wall of the wind tunnel 1 and the sample 2 was completely sealed with a sealing material and, thereby, consideration was given to prevent leakage.

Figure 5:
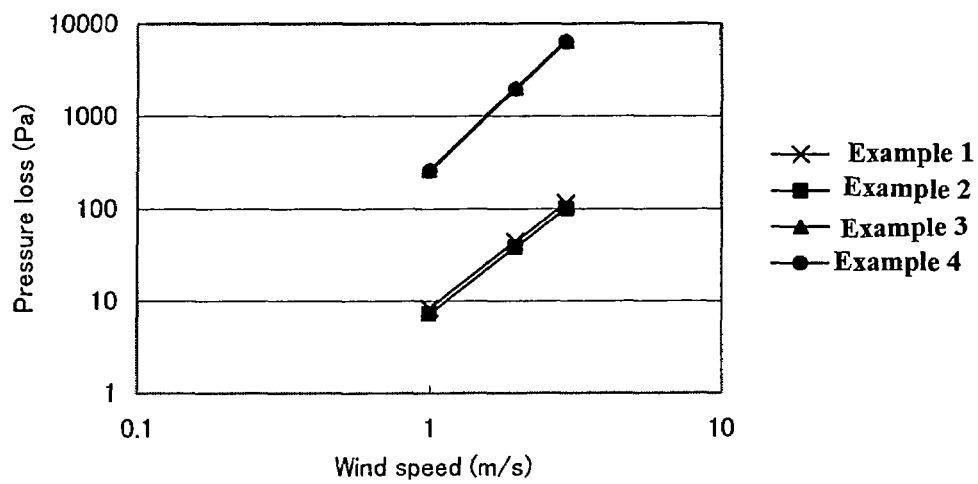
FIG. 5 is a graph showing the measurement results of pressure losses of samples of Examples 1 to 4.

From these results, the following relational expressions between the pressure loss and the wind speed were derived based on the graph shown in FIG. 5. The pressure losses when the wind speed is 1 m/sec are shown in Table 1.

Figure 4:
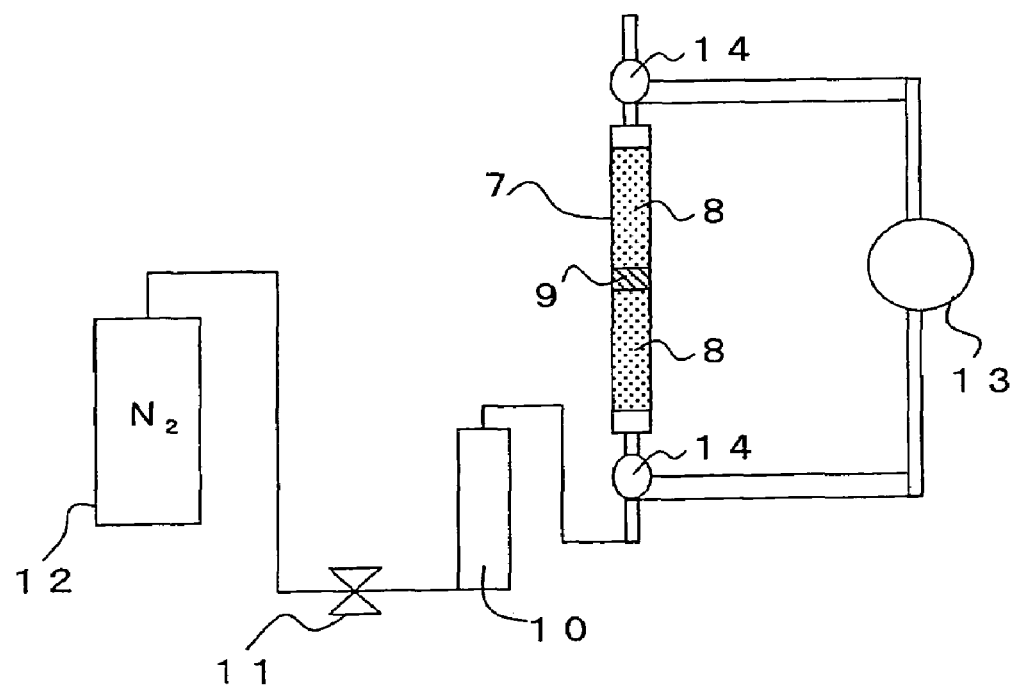
FIG. 4 is a configuration diagram of a test apparatus used for measuring pressure losses of samples of Comparative examples 1 and 2.

Example 1: $y=8.33x^{2.388}$
Example 2: $y=7.26x^{2.39}$
Example 3: $y=264.00x^{2.92}$
Example 4: $y=256.08x^{2.92}$ On the other hand, with respect to the samples of Comparative examples 1 and 2, since powders are subjected to measurements, the test apparatus shown in FIG. 3 cannot be used. Consequently, the measurement was conducted with a test apparatus including a glass column 7 having an inner diameter of 14 mm and a length of 200 mm, as shown in FIG. 4.

Polyurethane foams ("EVERLIGHT SF, HR-08" produced by Bridgestone Corporation) 8 having a three-dimensional network skeleton structure and having a diameter of 14 mm produced by hollowing were placed upstream and downstream to glass filters ("GA" produced by ADVANTEC) to prevent falling of powders, the glass filters prepared by stamping to have a diameter of 18 mm and set on the top and the bottom of a powder sample 9 in the inside of the glass column 7, and the polyurethane foams were fixed to the inside of the column 7.

It was assumed that the sample of Example 2 (thickness 17.29 mm, density 249.1 g/L) having the lightest density after firing among the samples of Examples 1 to 4 was filled in the above-described column 7 having a diameter of 14 mm, and the amount of packing was converted to the amount of packing of the powder samples of Comparative examples 1 and 2. The resulting weight, 0.66 g, of the sample was weighed with an analytical balance, and was filled in the column 7.

A valve 11 was operated while the reading of a flowmeter 10 was monitored and, thereby, the flow rate (wind speed) from a $N_2$ bomb 12 was changed to 1 L/min (0.108 m/sec), 2 L/min (0.217 m/sec), and 3 L/min (0.3248 m/sec). The pressure loss between the upstream and the downstream to the sample 9 was measured with a manometer 13.

Figure 6:
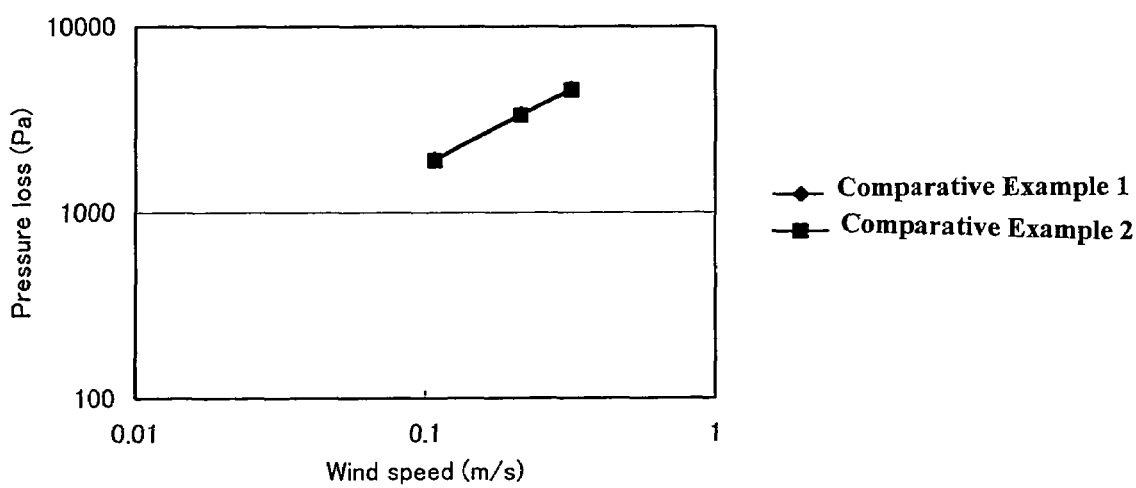
FIG. 6 is a graph showing the measurement results of pressure losses of samples of Comparative examples 1 and 2.

A net pressure loss of the powder was calculated from these results, and the following relational expressions between the pressure loss and the wind speed were derived based on the graph shown in FIG. 6. The pressure losses converted to the values at 1 m/sec were determined, and are shown in Table 1.

Comparative example 1: $y=11422.8x^{0.08}$
Comparative example 2: $y=11194.3x^{0.8}$ The evaluation of Comparative examples 1 and 2 were conducted in a lower wind speed state as compared with that of Examples 1 to 4. This is because Comparative examples 1 and 2 exhibited excessively high pressure losses, and the evaluation was not able to be conducted in a high wind speed state. With respect to Examples 1 to 4, the blank pressure loss of the apparatus was measured beforehand. With respect to Comparative examples 1 and 2, the blank pressure loss of the apparatus and the packing for fixing the sample was measured beforehand. Table 1 shows a net value determined by subtracting the blank pressure loss from the pressure loss after the sample is set up.

<Measurement of Compressive Fracture Strength>

The compressive fracture strengths of the samples of Examples 1 to 4 were measured at a compression test speed of 10 mm/min by using a compression tester equipped with a 5 KN load cell. The results are shown in Table 1.

<Measurement of Shrinkage Factor after Firing>

The dimensions after firing of the samples of Examples 1 to 4 were measured with a digital caliper, resulting in the following respective values. The shrinkage factors relative to the size of the unfired impregnated-foam (50 mm×50 mm×25 mm thick) were calculated based on the resulting values. The results are shown in Table 1.

Example 1: 45.3 mm×44.7 mm×16.45 mm thick
Example 2: 46.9 mm×47.1 mm×17.29 mm thick
Example 3: 47.4 mm×46.6 mm×18.20 mm thick
Example 4: 48.1 mm×47.9 mm×19.04 mm thick <Containing Density of Lithium Silicate>

It was assumed that the following formula held with respect to the samples of Examples 1 to 4 and Comparative examples 1 and 2. The containing density of lithium silicate (theoretical value) was calculated from the apparent density. The results are shown in Table 1.

$$2Li_2CO_3 + SiO_2 + 1/10 K_2CO_3 \rightarrow Li_4SiO_4 + 1/10 K_2CO_3 + 2CO_2$$

<Porosity>

The true specific gravities of the structures of the samples of Examples 1 to 4 were determined based on the Archimedean principle, resulting in about 2.0. Therefore, the porosity was determined based on the following equation. The results are shown in Table 1.

porosity (%)={1−(apparent specific gravity/true specific gravity of structure)}×100

<Apparent Density or Packing Density>

The weights of the samples of Examples 1 to 4 weighed with an analytical balance were divided by the respective sizes after firing measured with a digital caliper. The resulting values (apparent specific gravity in the above-described equation) were taken as apparent densities, and are shown in Table 1.

With respect to the samples of Comparative examples 1 and 2, 10 ml graduated cylinders were used, and 3 g of each of samples of Comparative examples 1 and 2 was filled in the graduated cylinder. The packaging density was calculated from the packaging volume after tube wall of the graduated cylinder was lightly tapped 10 times with a spatula. The results are shown in Table 1.

TABLE 1

| Case | Example | | | | Comparative example | |
|---|---|---|---|---|---|---|
| | 1 | 2 | 3 | 4 | 1 | 2 |
| Status | Three-dimensional network skeleton structure | | Three-dimensional network void structure | | Powder | |
| Presence or Absence of organic additive | none | present | none | present | none | present |
| Initial capability CO$_2$ adsorption ratio (percent by weight) | 31.0 | 31.7 | 28.3 | 27.6 | 22.5 | 22.7 |
| After initial adsorption-desorption operation CO$_2$ residual ratio (percent by weight) | 2.2 | 1.9 | 3.8 | 4.6 | 8.6 | 7.3 |
| Second time CO$_2$ adsorption ratio (percent by weight) | 34.9 | 33.2 | 29.6 | 28.7 | 21.7 | 20.9 |
| Second adsorption-desorption operation CO$_2$ residual ratio (percent by weight) | 2.8 | 1.7 | 3.1 | 4.3 | 9.1 | 6.9 |
| 1 m/sec Pressure loss (Pa) | 8.33 | 7.26 | 264 | 256 | $11.42 \times 10^3$ | $11.19 \times 10^3$ |
| Compressive fracture strength of structure (KPa) | 56.7 | 64.4 | 137.3 | 160.7 | — | — |
| Shrinkage factor of structure after firing (%) | 46.7 | 38.9 | 35.7 | 29.8 | — | — |
| Containing density of lithium silicate (g/L) | 253.6 | 223.4 | 600.5 | 548.8 | 771.1 | 771.1 |
| Porosity of structure (%) | 85.86 | 87.55 | 66.52 | 69.4 | — | — |
| Apparent density or Packing density | 282.8 | 249.1 | 669.7 | 612.1 | 857 | 857 |

As is clear from the above-described results, the samples of Examples 1 to 4 are high-strength structures having excellent durability against repeated stresses, e.g., compressive fracture stress and expansion and shrinkage and, in addition, these samples exhibit low pressure losses and excellent carbon dioxide adsorption-desorption capabilities as compared with those of samples of Comparative examples 1 and 2.

As described above in detail, according to the present invention, the carbon dioxide adsorption-desorption material having a high carbon dioxide adsorption-desorption capability, a low pressure loss, a high thermal diffusion efficiency, and high resistance to repeated stresses, e.g., expansion and shrinkage, as well as an adsorption-desorption apparatus including the adsorption-desorption material and having excellent carbon dioxide adsorption-desorption efficiency, is provided.

The invention claimed is:

1. A carbon dioxide adsorption-desorption material characterized by comprising a three-dimensional network skeleton structure constructed by a compound having a carbon dioxide adsorption-desorption capability, wherein the three-dimensional network skeleton structure is produced by applying the compound having a carbon dioxide adsorption-desorption capability or a slurry containing an organic additive and raw materials capable of synthesizing the compound having a carbon dioxide adsorption-desorption capability through firing to a skeleton surface of an organic base material having a three-dimensional network skeleton structure, followed by firing.

2. The carbon dioxide adsorption-desorption material according to claim 1, characterized in that the compound having a carbon dioxide adsorption-desorption capability is at least one selected from the group consisting of oxides, hydroxides, and salts of alkali metals and alkaline-earth metals.

3. The carbon dioxide adsorption-desorption material according to claim 2, characterized in that the compound having a carbon dioxide adsorption-desorption capability is at least one selected from the group consisting of $Li_4SiO_4$, $Li_2SiO_3$, $Li_6Si_2O_7$, $Li_8SiO_6$, $Li_2ZrO_3$, $Li_4ZrO_4$, $Li_2NiO_2$, $2LiFeO_2$, $Li_2O$, $Na_2O$, $CaO$, $LiAlO_2$, $LiOH$, $KOH$, $NaOH$, $Ca(OH)_2$, $Ba(OH)_2$, $Sr(OH)_2$, $K_2CO_3$, $Na_2CO_3$, $Li_2CO_3$, $BaCO_3$, $CaCO_3$, and $SrCO_3$.

4. The carbon dioxide adsorption-desorption material according to claim 1, characterized in that carbon dioxide is separated, adsorbed, or desorbed by varying a temperature and/or a pressure.

5. The carbon dioxide adsorption-desorption material according to claim 1, characterized in that the compound having a carbon dioxide adsorption-desorption capability is produced by subjecting a mixture of at least one inorganic compound selected from the group consisting of oxides, hydroxides, and salts of alkali metals and alkaline-earth metals and an inorganic oxide other than alkali metal oxides and alkaline-earth metal oxides to firing and/or synthesis at 600° C. or more.

6. The carbon dioxide adsorption-desorption material according to claim 5, characterized in that the heat treatment is a firing treatment.

7. The carbon dioxide adsorption-desorption material according to claim 5, characterized in that the inorganic oxide is at least one selected from the group consisting of $SiO_2$, $Al_2O_3$, $ZrO_2$, $MgO$, $Fe_2O_3$, $NiO$, and $TiO_2$.

8. The carbon dioxide adsorption-desorption material according to claim 1, characterized in that the organic base material comprises one of a polyurethane foam, a polyethylene foam, a resin net having a three-dimensional structure, a nonwoven fabric, paper, corrugated paper, and felt.

9. The carbon dioxide adsorption-desorption material according to claim 1, characterized by having a porosity of 25% to 95%.

10. A carbon dioxide adsorption-desorption apparatus characterized by comprising the carbon dioxide adsorption-desorption material according to claim 1.

* * * * *